UNITED STATES PATENT OFFICE 2,446,121

COMPOSITIONS OF POLYMERIC PLASTICIZERS AND ORGANIC PLASTIC MATERIALS

David E. Adelson, Berkeley, and Hans Dannenberg, Berkeley Highlands, Calif., assignors to Shell Development Company, San Francisco, Calif., a corporation of Delaware No Drawing. Application October 10, 1944, Serial No. 558,110

1 Claim. (Cl. 260—17)

This invention relates to compositions comprising organic plastics and elastics containing organic acid esters of polymeric allyl-type alcohols.

This application is a continuation-in-part of our copending application, Serial Number 417,278, filed October 31, 1941, now abandoned.

To be suitable for most purposes organic plastics and elastics require the addition of a plasticizer. Satisfactory plasticizers must be capable of imparting to the plastic or elastic compositions in which they are used the particular combination of desirable properties which make the compositions of value in the applications for which they are designed. Thus, in the case of coating compositions the plastic/plasticizer combination must usually be capable of producing film coatings which are flexible over a wide temperature range, hard, resistant to abrasion, highly glossy, impervious to the attack of many physical and chemical agents and tenaciously adherent to the surfaces upon which they are applied. Mere compatibility of the plasticizer with the plastic is no criterion of usefulness. Consequently, although large numbers of substances have been suggested as plasticizers, only a comparatively few are useful and the long felt need for a better plasticizer has been a constant stimulus to research.

We have now discovered new plastic and elastic compositions containing as plasticizers esters of monobasic organic acids with polymeric allyl-type alcohols. We have found that by the use of these polymeric compounds as plasticizers compositions can be produced which are outstandingly superior to corresponding compositions containing any of the usual plasticizers of which we are aware. These new plasticizers are capable of producing film coatings of unusual hardness, durability and gloss. They may be employed not only with plastics but also with elastics, including natural and synthetic rubber, resulting in compositions of high physical strength.

The new plasticizers are esters of monobasic organic acids with polymeric allyl-type alcohols. Polymeric allyl-type alcohols are polymers of allyl-type alcohols, which are real or theoretical compounds having a double bond of aliphatic character between two carbon atoms one of which is attached directly to a saturated carbon atom which in turn is attached directly to an alcoholic hydroxyl group, as represented by the general formula

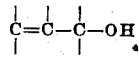

Preferred allyl-type alcohols have a terminal methylene group attached directly by an olefinic double bond to a carbon atom which in turn is attached directly to a saturated carbinol carbon atom, as represented by the formula

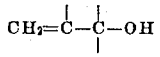

Allyl-type alcohols preferably have not more than about eighteen carbon atoms and have at least one unsaturated carbon-to-carbon linkage for each six carbon atoms.

Representative examples of preferred allyl-type alcohols are the following: allyl alcohol, methallyl alcohol, ethallyl alcohol, choroallyl alcohol, buten-1-ol-3, penten-1-ol-3, hexon-1-ol-3, 3-methyl-buten-1-ol-3, 3-methyl-penten-1-ol-3, 2-methyl-buten-1-ol-3, 2-methyl-penten-1-ol-3, 2,3-dimethyl-buten-1-ol-3, hepten-1-ol-3, 4-methyl-hexen-1-ol-3, 5-methyl-hexen-1-ol-3, 4,4'-dimethyl-penten-1-ol-3, octen-1-ol-3, 6-methyl-hepten-1-ol-3, 4-methyl-hepten-1-ol-3, 4,4'-dimethyl-hexen-1-ol-3, 3-phenyl-propen-1-ol-3, 3-tolyl-propen-1-ol-3, 3-xylyl-propen-1-ol-3, 4-phenyl-buten-1-ol-3, 4-tolyl-buten-1-ol-3, 4-xylyl-buten-1-ol-3, 3-naphthyl-propen-1-ol-3, 4-chloro-buten-1-ol-3, pentadien-1,4-ol-3, hexen-1-yn-5-ol-3, 2-methyl-penten-1-yn-4-ol-3, and 2,5-dimethyl-hexadien-1,5-ol-4. Other allyl-type alcohols are crotyl alcohol, tiglyl alcohol, 3-chloro-buten-2-ol-1, cinnamyl alcohol, hexadien-2,4-ol-1, hexadiene-2,5-ol-1, butadien-2,3-ol-1, hexadien-3,5-ol-2, 2-methyl-hexen-2-ol-1, 2-methyl-penten-2-ol-1, 3,7-dimethyl-octadien-2,7-ol-1, cyclopenten-2-ol-1, cyclohexen-2-ol-1, etc. Allyl alcohol is the preferred allyl-type alcohol.

Polymers of allyl-type alcohols contain in the molecule a plurality of groups having the following structure:

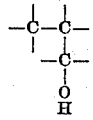

The new plasticizers of the invention are esters of polymeric allyl-type alcohols with monobasic organic acids. One group of suitable acids consists of monocarboxylic aliphatic acids such as formic, phenoxyformic, acetic, phenylacetic, propionic, chloroacetic, bromopropionic, lactic, butyric, isobutyric, valeric, glycolic, acetylglycolic, methoxyacetic, stearic, levulinic, etc. acids. Monocarboxylic cycloaliphatic and aromatic acids are suitable, e. g. furoic, abietic, hydrogenated abietic, benzoic, naphthenic, toluic, salicylic, etc. acids. The esters of acids devoid of readily polymerizable unsaturated carbon-to-carbon linkages are ordinarily preferred, although compositions containing such esters may be employed and, in some cases, may be highly desirable. Examples of monocarboxylic acids having aliphatic carbon-to-carbon unsaturation are propiolic, acrylic, alpha-chloroacrylic, crotonic, methacrylic, cinnamic, oleic, linoleic, linolenic, etc. Other suitable acids are thiolic acids which may be represented by the general formula

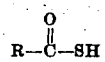

and dithio acids, represented by the formula

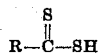

Typical substances which may be employed as plasticizers in accordance with the invention include polymers of the following allyl-type esters: allyl formate, allyl acetate, allyl propionate, allyl butyrate, allyl isobutyrate, beta-methylallyl acetate, beta-chlorallyl acetate, beta-ethylallyl formate, beta-phenylallyl acetate, beta-methoxyallyl acetate, beta-chloromethylallyl acetate, allyl benzoate, beta-methylallyl acetate, allyl toluate, allyl salicylate, allyl glycolate, allyl methoxyacetate, beta-methylallyl chloracetate, allyl beta-chloropropionate, allyl lactate, allyl naphthenate, beta-methylallyl chlorobenzoate, allyl alpha-hydroxyisobutyrate, allyl acetylglycolate, allyl laurate, allyl myristate, allyl stearate, allyl levulinate, beta-methylallyl butyrate, alpha-methylallyl acetate, alpha-phenylallyl acetate, allyl ethoxyformate, beta-methylallyl phenoxyformate, allyl naphthoate, allyl esters of hydrogenated abietic acid.

In most cases the polymeric allyl-type ester plasticizers are produced most readily by the polymerization of the corresponding monomers. The esters of the carboxylic acids may be polymerized by heating in the presence of a polymerization catalyst.

Benzoyl peroxide is a generally effective polymerization catalyst. Other polymerization catalysts are acetyl peroxide, benzoyl acetyl peroxide, lauryl peroxide, dibutyryl peroxide, succinyl peroxide, sodium peroxide, barium peroxide, tertiary alkyl hydroperoxides such as tertiary butyl hydroperoxide (often called simply tertiary butyl peroxide), di(tertiary alkyl) peroxides such as di(tertiary butyl) peroxide, peracetic acid, perphthalic acid, perborates, persulfates, etc. The compounds may be polymerized in the presence of their own peroxides or of their ozonides. Metals and metallic salts may be used as polymerization catalysts. If desired, mixtures of polymerization catalysts may be used. In some cases it may be desirable to conduct the polymerization in the concurrent presence of both a catalyst and an inhibitor of polymerization. Amounts of peroxide catalyst between about 0.01% and about 5% by weight of the polymerizable unsaturated compound or compounds are usually satisfactory, although the amount is not necessarily limited to this range. In some cases, it may be unnecessary to use any catalyst at all.

The temperature at which the polymerization is conducted may be varied over a wide range. Temperatures of from about room temperature to about 300° C. have been used. The polymerization is preferably effected at between about 60° C. and about 250° C. employing in the lower range, e. g. 60° C. to 130° C., a catalyst such as benzoyl peroxide which is effective and relatively stable in that range, and in the higher range, e. g. 130° C. to 250° C., a catalyst such as tertiary butyl hydroperoxide or a di(tertiary alkyl) peroxide. It is sometimes desirable to polymerize in two or more different stages using different temperatures and/or different catalysts. The reaction is most efficient at above about 180° C., high conversions being quickly obtained.

Polymerization may be carried out in a continuous or batchwise manner under atmospheric, superatmospheric or reduced pressures. Usually it is preferred to exclude molecular oxygen, conveniently by providing an atmosphere of an oxygen-free inert gas such as nitrogen, carbon dioxide, etc. The polymeric esters may be separated from the other ingredients of the reaction mixture and purified, if desired, in any known or special manner.

If desired, however, the polymeric esters may be produced from other polymeric allyl-type compounds. Suitable polymeric esters may be produced by esterifying a polymeric allyl-type alcohol with a monocarboxylic acid. Polymeric allyl-type alcohols may be produced by heating the monomeric alcohol in the presence of a polymerization catalyst or by the hydrolysis or alcoholysis of a suitable derivative such as an acetal or another ester. Likewise the desired ester may be produced by ester-exchange or ester-interchange with another polymeric allyl-type ester.

Esters of the thio acids and dithio acids may sometimes be produced by the polymerization of the monomer, although, because of the polymerization-inhibiting effect of the sulfur, they must usually be produced from another polymeric allyl-type alcohol derivative. Thio esters may be produced by reacting sodium hydrogen sulfide with the polymeric allyl-type chloride, forming sodium chloride and the polymeric allyl-type mercaptan, which latter may then be reacted with the desired acid anhydride, preferably in the presence of a small amount of a base such as sodium hydroxide, forming the thio ester. The polymeric allyl-type chloride may be produced by the polymerization of the monomer, preferably under the influence of actinic light and/or a catalyst such as boron trifluoride, the latter at a low temperature and under anhydrous conditions. If desired, the mercaptan may be produced by reacting sulfuric acid with the polymeric allyl-type alcohol, then exactly neutralizing, preferably with sodium bicarbonate or the like, forming the sodium salt of the acid sulfate of the polymeric allyl-type alcohol, which salt is then converted into the mercaptan by reacting with sodium hydrogen sulfide. The dithio ester may be produced by reacting the polymeric allyl-type alcohol, or, preferably, the polymeric allyl-type mercaptan, with the dithio acid. Dithio acids may be produced by the addition of carbon disulfide to a suitable Grignard reagent, followed by hydrolysis of the addition product according to the following general equation:

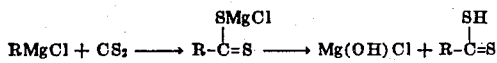

Mixed esters may be employed. Mixed esters may be produced by the copolymerization of two or more monomeric esters, by the esterification of a polymeric allyl-type alcohol with two or more different acids, by the esterification of a polymeric allyl-type ester-alcohol (a polymeric allyl-type compound containing both alcoholic hydroxyl groups and ester groups) with another acid, by partial ester-exchange or partial ester-interchange, or in any other suitable manner. Compounds containing alcoholic hydroxyl groups, acetal groups, halogen atoms, etc., in addition to ester groups, may be employed. Preferred compounds contain at least one ester group (acid residue) for each two allyl-type units in the polymer molecule, i. e. for each two allyl-type monomer molecules combined in the polymer.

The polymeric allyl-type esters consist essentially of polymer molecules composed of monomer units (molecules) linked principally through carbon. As usually produced, the average polymerization degree, i. e. the average number of monomer units making up a polymer molecule, is between about 6 and about 12 inclusive, although lower and higher polymers can be produced. The esters may have an average polymerization degree of 20 or more.

The polymeric allyl-type esters range in viscosity from readily mobile liquids to solid substances. As usually produced the esters are somewhat discolored. They contain small amounts of residual unsaturation and may tend to become more discolored in storage and use. The esters may be decolorized and stabilized by catalytic or electrolytic hydrogenation, whereby the unsaturation is reduced. The hydrogenated as well as the unhydrogenated esters may be employed as plasticizers in accordance with the invention. Since the hydrogenation does not necessarily appreciably decrease the small amount of residual unsaturation of the polymers, the term "polymeric allyl-type esters" is used here, as in the art, to include hydrogenated polymeric allyl-type esters. Likewise, polymeric allyl-type esters may be employed which have been treated with sulfur, sulfur-containing compounds, halogens, halogen-containing compounds, etc.

The polymeric allyl-type esters may be employed as plasticizers for a wide variety of plastics and elastics. They may be used with natural resins such as colophony, shellac, copal, dammar, camphor, rosin, polymerized rosin, hydrogenated rosin, asphalt, gilsonite, and the like. The esters are particularly important in plasticizing regenerated cellulose and cellulose derivatives such as cellulose esters, e. g. cellulose nitrate, cellulose acetate, cellulose acetate-butyrate, cellulose acetate-propionate, etc., and cellulose ethers, e. g., ethyl cellulose. They may be used with protein plastics. They are useful plasticizers for condensation-type resins such as phenol-aldehyde, urea-adehyde, alkyd resins, synthetic linear polyamides and synthetic linear polyesters. Other plastics include those obtainable by the polymerization of one or more unsaturated compounds or by the physical or chemical alteration of polymers so produced. One group of unconjugated unsaturated polymerizable organic compounds consists of those having but a single polymerizable unsaturated carbon-to-carbon linkage. Notable among these are compounds having a single polymerizable aliphatic double bond linkage, examples of which are styrene, alpha-methyl styrene, dichlorostyrene, vinyl naphthalene, vinyl halides, vinylidene halides, vinyl esters of saturated monocarboxylic acids, such as vinyl acetate, vinyl propionate, vinyl butyrate, vinyl valerate, vinyl benzoate, etc., vinyl ethers, methyl acrylate, methyl methacrylate, allyl halides, allyl esters, of many saturated monocarboxylic acids, etc. Another important group of unconjugated polymerizable compounds consists of those having two or more non-conjugated polymerizable double bonds. Examples of these are unsaturated aliphatic polyesters of saturated polybasic acids, such as the vinyl, allyl and methallyl polyesters of oxalic, malonic, glutaric, adipic, sebacic, citric, tricarballylic, phthalic, isophthalic and naphthalene dicarboxylic acids; unsaturated aliphatic polyethers of saturated polyhydric alcohols, such as vinyl, allyl, and methallyl polyethers of glycol, diethylene glycol, triethylene glycol, trimethylene glycol, propylene glycol, glycerol, diglycerol, pentaglycerol, pentaerythritol, polypentaerythritol and the like; unsaturated aliphatic organic acid polyesters of polyhydric alcohols, such as the acrylic, methacrylic and crotonic polyesters of the polyhydric alcohols given hereinabove; unsaturated aliphatic esters of unsaturated aliphatic acids, such as vinyl, allyl and methallyl esters of acrylic, methacrylic, chloroacrylic, crotonic, itaconic, citraconic and cinnamic acids. Polyethylene and the like may be plasticized in accordance with the invention.

Other polymerizable unsaturated compounds whose polymers may be so plasticized are those containing in the molecule one or more polymerizable organic radicals and one or more inorganic radicals or elements. Examples are vinyl, allyl and methallyl esters of phosphoric acid and of the ortho acids of silicon, boron, etc.

Resins and the like produced from silicones such as dimethyl silicone, diethyl silicone, diallyl silicone, dimethylallyl silicone, etc. may be plasticized in accordance with the invention.

Other substances which may be plasticized in accordance with the invention are polymers (or derivatives thereof) of compounds having two or more, preferably two, conjugated unsaturated polymerizable carbon-to-carbon linkages. These compounds are substantially hydrocarbon in character, although they may contain substituents, such as halogen, nitro, sulfo, etc. In preferred compounds of this type, at least one unsaturated carbon-to-carbon linkage is a double bond. Of these a subgroup consists of hydrocarbons and substituted hydrocarbons having in the molecule a carbon-to-carbon double bond in conjugated relationship with a carbon-to-carbon triple bond, as found in vinyl acetylene and divinyl acetylene. By far a more important subgroup, however, consists of hydrocarbons and substituted hydrocarbons having in the molecule two double bonds in conjugated relationship with one another. Representative examples of such compounds are 1,3-butadiene, 2-chloro-1,3-butadiene, isoprene, the other conjugated pentadienes, the conjugated hexadienes (e. g. 2-methyl-1,3-pentadiene, 4-methyl-1,3-pentadiene, etc.), the conjugated heptadienes, the conjugated octadienes, the conjugated nonadienes, the conjugated decadienes, the conjugated cyclopentadienes, the conjugated cyclohexadienes, etc. In general, the polymerization of conjugated diene hydrocarbons and substituted hydrocarbons results in products which are synthetic elastomers in character and, as a consequence, belong to the general group of substances known as synthetic rubbers.

Copolymers as well as homopolymers may be plasticized in accordance with the invention. The plastics and elastics may be modified during or after production in any suitable manner. Likewise the plasticized compositions may contain two or more plastic substances, which may or may not have been separately produced, in admixture with one another. In addition to one or more plastics, elastics and polymeric allyl-type ester plasticizers the compositions may contain other plasticizers, solvents, stabilizers, lubricants, dyes, pigments, fillers, etc. The choice and amount of such other ingredients will depend upon many factors, including the nature and proportions of the other components of the composition, the intended use, etc.

Likewise, the amount of polymeric allyl-type ester employed as plasticizer will depend upon these and other factors. Where the ester is used as the sole plasticizer amounts ranging from about 10 to about 100 parts of plasticizer per 100 parts of plastic and/or elastic are ordinarily satisfactory. Some of the esters are not compatible in large proportions with some of the more difficultly plasticized substances such as polyvinyl chloride, in which cases it is preferred to employ as plasticizers a relatively small proportion of a polymeric allyl-type ester or mixture of esters together with other more readily compatible plasticizers.

Plasticized plastic and elastic compositions in accordance with the invention may be designed for any of a large variety of uses. Such compositions may be employed in varnishes, baking enamels, paints, lacquers, adhesives, cements, impregnating compositions, stencil paper, insulating material, phonograph records, sustaining films, sheets, filaments, threads, floor coverings, etc. The polymeric allyl-type esters are particularly valuable as plasticizers and plasticizing resins in lacquers, lending tenacity, flexibility and enhanced gloss to the films laid down thereby.

The following examples are designed to illustrate some of the many ways in which the invention can be practiced. Parts are on a weight basis.

Example I

Plastic compositions were produced consisting of ½ second R. S. cellulose nitrate, 2 parts, homogeneously blended with a plasticizer, 1 part, as indicated in the following table. Clean sheets of glass were then coated to a wet film thickness of 0.010 inch with a solution of the plasticized cellulose nitrate in an inert volatile solvent. The solvent was allowed to evaporate. The coated panels were dried at 50° C. and 10% relative humidity for one week, following which the gloss and hardness of the coatings were measured. The panels were then subjected to severe accelerated weathering under a cycle made up of alternate periods of light, moisture and cooling, the change in gloss and hardness being measured after 21 days.

| Plasticizer | Initial | | 21 days | |
|---|---|---|---|---|
| | Gloss [1] | Hardness [2] | Gloss [1] | Hardness [2] |
| None | 98 | 50 | Film fell off | |
| Tricresyl phosphate | 100 | 20 | 93.0 | 32 |
| Dibutyl phthalate | 98 | 30 | 95.5 | 52 |
| Polyallyl acetate | 97 | 60 | 95.5 | 42 |

[1] Measured by a photoelectric glossmeter.
[2] Measured by a Sward hardness rocker (gloss=100).

These results show the exceedingly high resistance to accelerated weathering of cellulose nitrate films plasticized with polyallyl acetate.

Example II

Lacquers were prepared consisting of ½ second R. S. cellulose nitrate, 30 parts, and plasticizer (as indicated in the following table), 15 parts, dissolved in methyl ethyl ketone, 55 parts. The lacquers were used in coating clean glass panels to a wet film thickness of 0.005 inch. The solvent was allowed to evaporate. The coated panels were dried for one week at 50° C. and 10% relative humidity and were then maintained at 25° C. in an atmosphere having a relative humidity of 50% for 3 days. At the end of this period the hardness and abrasion resistance of the film coatings were determined.

| Plasticizer | Hardness [2] | Abrasion Resistance [1] |
|---|---|---|
| None | 60 | 175 |
| Tricresyl phosphate | 42 | 91 |
| Dibutyl phthalate | 36 | 130 |
| Polyallyl acetate | 64 | 129 |

[1] Measured by the method described in Ind. Eng. Chem., Anal. Ed. 3, 72 (1931) and reported in grams of carborundum per 0.01 mm. of film thickness.
[2] Measured by a Sward hardness rocker (gloss=100).

Example III

A plastic composition was produced comprising ½ second R. S. cellulose nitrate, 33.3 parts, homogenously blended with polyallyl acetate (molecular weight about 605), 66.7 parts. The composition was dissolved in a mixture of equal parts by volume of methyl isobutyl ketone and methyl ethyl ketone, forming a lacquer having 20% by weight total solids. Clean sheet steel was coated with the lacquer to a wet film thickness of 0.009 inch. The coated panels were partially dried at room temperature, then maintained in a drying oven for three weeks at 70° C. At the end of this time they were removed from the oven and bent sharply over a steel mandrel having a diameter of $\frac{3}{32}$ inch to determine the flexibility of the film.

Another composition was prepared consisting of ½ second R. S. cellulose nitrate, 25 parts, polyallyl acetate (molecular weight, 605), 50 parts, and dibutyl phthalate, 25 parts. A lacquer having 20% by weight total solids content was prepared as above and used in coating sheet steel panels which were dried and subjected to the flexibility test.

For comparison other panels were coated with a lacquer consisting of unplasticized cellulose nitrate in solvent. The results of the tests are given in the following table:

| Solids, parts by weight | | | Film thickness, inches | Flexibility | Hardness [1] | Adhesion |
|---|---|---|---|---|---|---|
| Cellulose nitrate | Polyallyl Acetate | Dibutyl Phthalate | | | | |
| 33.3 | 66.7 | | 0.0026 | Cracked slightly | Good | Good |
| 100 | | | 0.0026 | Cracked badly | Excellent | Poor |
| 25 | 50 | 25 | 0.0020 | No cracks | Very good | Good |

[1] Measured by the method described in Ind. Eng. Chem., Anal. Ed. 3, 72 (1931), and reported in grams of carborundum per 0.01 mm. of film thickness.

Example IV

Polyallyl acetate having a molecular weight of about 605 was milled with polyvinyl chloride (Vinylite QYNA) in the ratio of 2 parts of the former to 1 part of the latter. Milling was effected on rolls maintained at 110° C. to 120° C. In this way films having a thickness of about 0.026 inch were produced. The films had good flexibility and no exudation of plasticizer was evident. The films were slightly yellow in color.

Example V

Polyallyl butyrate produced by the polymerization of allyl butyrate at 210° C. for 65 hours in the presence of 1% of tertiary butyl hydroperoxide was milled with polyvinyl chloride (Vinylite QYNA) in the ratio of 2 parts of the former to 1 part of the latter. Light yellow films were produced having good flexibility and exhibiting no exudation of plasticizer.

Example VI

Polyallyl laurate produced by the polymerization of the monomer in the presence of air at 210° C. for 65 hours in the presence of 1% of tertiary butyl hydroperoxide was milled with polyvinyl chloride (Vinylite QYNA) in the ratio of 2 parts of the former to 1 part of the latter.

Example VII

Polyallyl acetate was employed as a plasticizer for a butadiene/acrylonitrile copolymer in accordance with the following recipe:

| | Parts |
|---|---|
| Copolymer[1] | 100. |
| Phenyl beta-naphthylamine | 1.0 |
| Benzthiazyl disulfide | 1.25 |
| Polyallyl acetate[2] | 25. |
| Zinc oxide | 5. |
| Channel black | 50. |
| Stearic acid | 0.5 |
| Sulfur | 1.25 |

[1] Copolymer of 40 parts of acrylonitrile with 60 parts of 1,3-butadiene.
[2] Produced by polymerizing allyl acetate, 100 parts, in the presence of 2 parts of dissolved benzoyl peroxide at 65° C. for 336 hours, followed by removal of the monomer by distillation under reduced pressure. The polymer had a molecular weight of about 400, as determined cryoscopically in benzene.

Different portions of the composition were cured at 153° C. for 20, 30 and 45 minutes.

Example VIII

The following composition was produced by blending the ingredients in the order named on a cold roll mill. Vulcanization was effected at 145° C.

| | Parts |
|---|---|
| Copolymer[1] | 100. |
| Polyallyl acetate[2] | 10. |
| Channel black | 50. |
| Mercaptobenzothiazole | 1.5 |
| Zinc oxide | 5. |
| Sulfur | 2. |

[1] Synthetic rubber consisting essentially of a copolymer of about 3 parts of 1,3-butadiene with about 1 part of styrene.
[2] Same as that used in Example VII.

Examples IX–XXXI

Lacquers of the following compositions were produced. In each case the hydrogenated polyallyl acetate used had a molecular weight of 632 as determined by ebullioscopic methods using benzene. "Lacquer grade" cellulose acetate having an acetyl value (as percent acetic acid) of 54–55.5% was used. The lacquer solutions were all clear and yielded clear films on drying in air.

| Experiment Number | Polyallyl Acetate, parts | Cellulose Acetate, parts | Solvent | Parts of Solvent |
|---|---|---|---|---|
| IX | 10 | 1 | methylene chloride plus ethanol | 80.1 / 8.9 |
| X | 5 | 5 | methylene chloride plus ethanol | 81. / 9 |
| XI | 1 | 10 | methylene chloride plus ethanol | 80.1 / 8.9 |
| XII | 10 | 1 | acetone | 89 |
| XIII | 5 | 5 | do | 96 |
| XIV | 1 | 10 | do | 89 |
| XV | 10 | 1 | methyl acetate | 89 |
| XVI | 5 | 5 | do | 90 |
| XVII | 1 | 10 | do | 89 |
| XVIII | 1 | 10 | ethylene dichloride plus ethanol | 80.1 / 8.9 |
| XIX | 10 | 1 | dioxane | 89. |
| XX | 5 | 5 | do | 90 |
| XXI | 1 | 10 | do | 89 |
| XXII | 10 | 1 | nitromethane | 89 |
| XXIII | 5 | 5 | do | 90 |
| XXIV | 1 | 10 | do | 89 |
| XXV | 10 | 1 | methyl cellosolve | 89 |
| XXVI | 10 | 1 | ethyl lactate | 89 |
| XXVII | 5 | 5 | do | 90 |
| XXVIII | 1 | 10 | do | 89 |
| XXIX | 10 | 1 | diacetone | 89 |
| XXX | 5 | 5 | do | 90 |
| XXXI | 1 | 10 | do | 89 |

The term "unsaturated," as used herein, refers to carbon-to-carbon unsaturation. The term "polymerization," as used herein, refers to polymerization through carbon-to-carbon unsaturation with accompanying decrease in unsaturation. The terms "plastics" and "elastics" are relative terms used to designate organic substances having a preponderance of plastic or elastic characteristics, respectively. "Elastics" is substantially equivalent to "rubbery substances" and is employed as a generic term in accordance with the usage of H. Barron in "Modern Synthetic Rubbers" (1944), pages 49 and 50. "Elastics" is equivalent to "elastomers" as employed by H. L. Fisher in Ind. Eng. Chem., Ind. Ed., 31, 941 (1939).

We claim as our invention:

A composition comprising 100 parts cellulose nitrate and as a plasticizer therefor from 10 to 100 parts of polyallyl acetate.

DAVID E. ADELSON.
HANS DANNENBERG.

REFERENCES CITED

The following references are of record in the file of this patent:

UNITED STATES PATENTS

| Number | Name | Date |
|---|---|---|
| 2,160,941 | Britton et al. | June 6, 1939 |
| 2,332,460 | Muskat et al. | Oct. 19, 1943 |
| 2,374,081 | Dean | Apr. 17, 1945 |
| 2,401,959 | Pfann et al. | June 11, 1946 |